United States Patent
Yliaho

(10) Patent No.: US 9,836,270 B2
(45) Date of Patent: Dec. 5, 2017

(54) METHOD AND APPARATUS FOR HANDLING THE DISPLAY AND AUDIO COMPONENT BASED ON THE ORIENTATION OF THE DISPLAY FOR A PORTABLE DEVICE

(75) Inventor: Marko Tapani Yliaho, Tampere (FI)

(73) Assignee: Nokia Technologies Oy, Espoo (FI)

( * ) Notice: Subject to any disclaimer, the term of this patent is extended or adjusted under 35 U.S.C. 154(b) by 40 days.

(21) Appl. No.: 14/364,657

(22) PCT Filed: Dec. 22, 2011

(86) PCT No.: PCT/IB2011/055913
§ 371 (c)(1),
(2), (4) Date: Oct. 11, 2014

(87) PCT Pub. No.: WO2013/093567
PCT Pub. Date: Jun. 27, 2013

(65) Prior Publication Data
US 2015/0178038 A1   Jun. 25, 2015

(51) Int. Cl.
*G06F 3/16* (2006.01)
*H04R 3/00* (2006.01)
(Continued)

(52) U.S. Cl.
CPC ............ *G06F 3/162* (2013.01); *G06F 1/1626* (2013.01); *G06F 1/1694* (2013.01); *G06F 3/011* (2013.01); *G06F 3/0488* (2013.01); *H04M 1/0202* (2013.01); *H04R 3/00* (2013.01); *H04R 3/005* (2013.01); *H04R 3/12* (2013.01); *H04R 7/045* (2013.01); *H04R 2400/03* (2013.01); *H04R 2410/05* (2013.01); *H04R 2420/01* (2013.01); *H04R 2440/05* (2013.01); *H04R 2499/11* (2013.01); *H04R 2499/15* (2013.01)

(58) Field of Classification Search
CPC ................ G06F 3/162; H04N 5/23212; H04N 21/42203; H04N 5/2252; H04M 1/0202
USPC ........................................................ 455/560
See application file for complete search history.

(56) References Cited

U.S. PATENT DOCUMENTS 8,243,961 B1   8/2012   Morrill
2001/0011993 A1   8/2001   Saarinen
(Continued)

FOREIGN PATENT DOCUMENTS

| JP | 2004364024 A | 12/2004 |
| KR | 20110133373 A | 12/2011 |
| WO | 2012/052803 A1 | 4/2012 |

OTHER PUBLICATIONS

International Search Report received for corresponding Patent Cooperation Treaty Application No. PCT/IB2011/055913, dated Jul. 12, 2012, 6 pages.
(Continued)

*Primary Examiner* — Kabir A Timory
(74) *Attorney, Agent, or Firm* — Alston & Bird LLP

(57) ABSTRACT

An apparatus comprising: a visual component generator configured to determine at least one display component and an audio component with an associated location relative to an apparatus display; an orientation determiner configured to determine an orientation of the display; and a component locator configured to determine the location of the at least one display component and audio component on the display dependent on the orientation of the display.

20 Claims, 8 Drawing Sheets

(51) Int. Cl.
*H04R 7/04* (2006.01)
*G06F 1/16* (2006.01)
*G06F 3/01* (2006.01)
*G06F 3/0488* (2013.01)
*H04M 1/02* (2006.01)
*H04R 3/12* (2006.01)

(56) References Cited

U.S. PATENT DOCUMENTS

| | | |
|---|---|---|
| 2005/0226455 A1 | 10/2005 | Aubauer et al. |
| 2008/0146289 A1* | 6/2008 | Korneluk ............ H04M 1/6041 455/569.1 |
| 2008/0254822 A1 | 10/2008 | Tilley |
| 2010/0285844 A1 | 11/2010 | Hosoi et al. |
| 2011/0044478 A1 | 2/2011 | Qu |
| 2011/0045812 A1 | 2/2011 | Kim et al. |

OTHER PUBLICATIONS

"Micromax Gravity GC700—Price, Features of the Dual Mode CDMA/GSM Mobile Phone", Newtechnology, Retrieved on Dec. 3, 2014, Webpage available at : http://www.newtechnology.co.in/micromax-gravity-gc700-pricefeatures-of-the-dual-mode-cdmagsm-mobile-phone/.

* cited by examiner

METHOD AND APPARATUS FOR HANDLING THE DISPLAY AND AUDIO COMPONENT BASED ON THE ORIENTATION OF THE DISPLAY FOR A PORTABLE DEVICE

RELATED APPLICATION

This application was originally filed as PCT Application No. PCT/IB2011/055913 filed on Dec. 22, 2011.

FIELD

The present invention relates to a display apparatus providing speaker functionality. The invention further relates to, but is not limited to, display apparatus providing speaker functionality for use in mobile devices.

BACKGROUND

Many portable devices, for example mobile telephones, are equipped with a display such as a glass or plastic display window for providing information to the user. Furthermore such display windows are now commonly used as touch sensitive inputs. The use of a touch sensitive input with the display has the advantage over a mechanical keypad in that the display may be configured to show a range of different inputs depending on the operating mode of the device. For example, in a first mode of operation the display may be enabled to enter a phone number by displaying a simple numeric keypad arrangement and in a second mode the display may be enabled for text input by displaying an alphanumeric display configuration such as a simulated Qwerty keyboard display arrangement.

Furthermore such devices typically also use electro-acoustic transducers to produce audio for earpiece and speaker operations as well as for alert tones. The moving coil dynamic speaker configuration used is typically relatively large in relation to the volume within the device and require specific signal processing considerations in order that the acoustic frequency response is acceptable. Furthermore moving coil transducers can attract contaminants such as small iron particles from within the internal volume of the device and also through ports provided to enable acoustic wave transmission from the speaker to the external environment. These contaminants can cause distortion and faults within the speakers significantly reducing the lifetime of the device.

STATEMENT

According to an aspect, there is provided a method comprising: determining at least one display component with an associated location relative to an apparatus display; determining an orientation of the display; and determining the location of the at least one display component on the display dependent on the orientation of the display.

The method may further comprise: determining at least one audio component with an associated location relative to the apparatus display; and determining the location of the at least one audio component with respect to the display based on the orientation of the display.

Determining the location of the at least one audio component may comprise: selecting at least one transducer element located adjacent the display dependent on the orientation of the display; and outputting an audio signal to the at least one transducer element selected.

Determining at least one audio component with an associated location relative to the apparatus display may comprise determining at least one apparatus state fixing the location relative to the apparatus display for the at least one audio component, wherein determining the location of the at least one audio component may comprise: determining the apparatus state; and determining the location of the at least one audio component dependent on the orientation of the display and the apparatus state.

The method may further comprise: determining a further orientation of the display; and determining a further location of the at least one audio component with respect to the display based on the further orientation of the display.

Determining the location of the at least one audio component may comprise: selecting at least one microphone transducer element located adjacent the display dependent on the orientation of the display; and inputting an audio signal from the at least one transducer element selected.

Determining at least one display component with an associated location relative to the apparatus display may comprise determining at least one apparatus state fixing the location relative to the apparatus display for the at least one display component, wherein determining the location of the at least one display component may comprise: determining the apparatus state; and determining the location of the at least one display component dependent on the orientation of the display and the apparatus state.

Determining the apparatus state may comprise at least one of: determining the apparatus call state; determining the apparatus activity state; and determining the apparatus user input state.

The method may further comprise determining the size of the at least one display component on the display dependent on the orientation of the display.

The method may further comprise determining the shape of the at least one display component on the display dependent on the orientation of the display.

The at least one of display component may comprise at least one of: a virtual button; a message image; a virtual transducer image; a virtual speaker image; at least one virtual control button; a virtual microphone image; and a virtual earpiece image.

The method may further comprise: determining at least one further display component with an associated location relative to an apparatus display and the at least one display element; and determining the location of the at least one further display component on the display dependent on the orientation of the display and the at least one display element.

The method may further comprise: determining a further indicator located adjacent to and surrounding the display; and illuminating and/or activating the at least one indicator dependent on the orientation of the display.

According to a second aspect there is provided apparatus comprising at least one processor and at least one memory including computer code for one or more programs, the at least one memory and the computer code configured to with the at least one processor cause the apparatus to at least perform: determining at least one display component with an associated location relative to an apparatus display; determining an orientation of the display; and determining the location of the at least one display component on the display dependent on the orientation of the display.

The apparatus may be further caused to perform: determining at least one audio component with an associated location relative to the apparatus display; and determining the location of the at least one audio component with respect to the display based on the orientation of the display.

Determining the location of the at least one audio component may cause the apparatus to perform: selecting at least one transducer element located adjacent the display dependent on the orientation of the display; and outputting an audio signal to the at least one transducer element selected.

Determining at least one audio component with an associated location relative to the apparatus display may cause the apparatus to perform determining at least one apparatus state fixing the location relative to the apparatus display for the at least one audio component, wherein determining the location of the at least one audio component may cause the apparatus to perform: determining the apparatus state; and determining the location of the at least one audio component dependent on the orientation of the display and the apparatus state.

The apparatus may be further caused to perform: determining a further orientation of the display; and determining a further location of the at least one audio component with respect to the display based on the further orientation of the display.

Determining the location of the at least one audio component may cause the apparatus to perform: selecting at least one microphone transducer element located adjacent the display dependent on the orientation of the display; and inputting an audio signal from the at least one transducer element selected.

Determining at least one display component with an associated location relative to the apparatus display may cause the apparatus to perform determining at least one apparatus state fixing the location relative to the apparatus display for the at least one display component, wherein determining the location of the at least one display component may cause the apparatus to perform: determining the apparatus state; and determining the location of the at least one display component dependent on the orientation of the display and the apparatus state.

Determining the apparatus state may cause the apparatus to perform at least one of: determining the apparatus call state; determining the apparatus activity state; and determining the apparatus user input state.

The apparatus may be further caused to perform determining the size of the at least one display component on the display dependent on the orientation of the display.

The apparatus may be further caused to perform determining the shape of the at least one display component on the display dependent on the orientation of the display.

The at least one of display component may comprise at least one of: a virtual button; a message image; a virtual transducer image; a virtual speaker image; at least one virtual control button; a virtual microphone image; and a virtual earpiece image.

The apparatus may be further caused to perform: determining at least one further display component with an associated location relative to an apparatus display and the at least one display element; and determining the location of the at least one further display component on the display dependent on the orientation of the display and the at least one display element.

The apparatus may be further caused to perform: determining a further indicator located adjacent to and surrounding the display; and illuminating and/or activating the at least one indicator dependent on the orientation of the display.

According to third aspect there is provided an apparatus comprising: means for determining at least one display component with an associated location relative to an apparatus display; means for determining an orientation of the display; and means for determining the location of the at least one display component on the display dependent on the orientation of the display.

The apparatus may further comprise: means for determining at least one audio component with an associated location relative to the apparatus display; and means for determining the location of the at least one audio component with respect to the display based on the orientation of the display.

The means for determining the location of the at least one audio component may comprise: means for selecting at least one transducer element located adjacent the display dependent on the orientation of the display; and means for outputting an audio signal to the at least one transducer element selected.

The means for determining at least one audio component with an associated location relative to the apparatus display may comprise means for determining at least one apparatus state fixing the location relative to the apparatus display for the at least one audio component, wherein determining the location of the at least one audio component may comprise: means for determining the apparatus state; and means for determining the location of the at least one audio component dependent on the orientation of the display and the apparatus state.

The apparatus may further comprise: means for determining a further orientation of the display; and means for determining a further location of the at least one audio component with respect to the display based on the further orientation of the display.

The means for determining the location of the at least one audio component may comprise: means for selecting at least one microphone transducer element located adjacent the display dependent on the orientation of the display; and means for inputting an audio signal from the at least one transducer element selected.

The means for determining at least one display component with an associated location relative to the apparatus display may comprise means for determining at least one apparatus state fixing the location relative to the apparatus display for the at least one display component, wherein the means for determining the location of the at least one display component may comprise: means for determining the apparatus state; and means for determining the location of the at least one display component dependent on the orientation of the display and the apparatus state.

The means for determining the apparatus state may comprise at least one of: means for determining the apparatus call state; means for determining the apparatus activity state; and means for determining the apparatus user input state.

The apparatus may further comprise means for determining the size of the at least one display component on the display dependent on the orientation of the display.

The apparatus may further comprise means for determining the shape of the at least one display component on the display dependent on the orientation of the display.

The at least one of display component may comprise at least one of: a virtual button; a message image; a virtual transducer image; a virtual speaker image; at least one virtual control button; a virtual microphone image; and a virtual earpiece image.

The apparatus may further comprise: means for determining at least one further display component with an associated location relative to an apparatus display and the at least one display element; and means for determining the location of the at least one further display component on the display dependent on the orientation of the display and the at least one display element.

The apparatus may further comprise: determining a further indicator located adjacent to and surrounding the display; and illuminating and/or activating the at least one indicator dependent on the orientation of the display.

According to a fourth aspect there is provided an apparatus comprising: a visual component generator configured to determine at least one display component with an associated location relative to an apparatus display; an orientation determiner configured to determine an orientation of the display; and a visual component locator configured to determine the location of the at least one display component on the display dependent on the orientation of the display.

The apparatus may further comprise: an audio component generator configured to determine at least one audio component with an associated location relative to the apparatus display; and an audio component locator configured to determine the location of the at least one audio component with respect to the display based on the orientation of the display.

The audio component locator may comprise: a transducer selector configured to select at least one transducer element located adjacent the display dependent on the orientation of the display; and an audio output configured to output an audio signal to the at least one transducer element selected.

The audio component generator may be configured to determine at least one apparatus state fixing the location relative to the apparatus display for the at least one audio component, wherein the audio component locator may be configured to determine the location of the at least one audio component dependent on the orientation of the display and the apparatus state.

The orientation determiner may be further configured to determine a further orientation of the display; and the audio locator may be further configured to determine a further location of the at least one audio component with respect to the display based on the further orientation of the display.

The audio component locator may comprise: a microphone transducer selector configured to select at least one microphone transducer element located adjacent the display dependent on the orientation of the display; and an audio input may be configured to input an audio signal from the at least one transducer element selected.

The visual component generator may be configured to determine at least one apparatus state fixing the location relative to the apparatus display for the at least one display component, and the visual component locator may be configured to: determine the apparatus state; and determine the location of the at least one display component dependent on the orientation of the display and the apparatus state.

The apparatus state may be at least one of: the apparatus call state; the apparatus activity state; and the apparatus user input state.

The apparatus may comprise a visual size determiner configured to determine the size of the at least one display component on the display dependent on the orientation of the display.

The apparatus may further comprise a visual shape determiner configured to determine the shape of the at least one display component on the display dependent on the orientation of the display.

The at least one of display component may comprise at least one of: a virtual button; a message image; a virtual transducer image; a virtual speaker image; at least one virtual control button; a virtual microphone image; and a virtual earpiece image.

The visual component determiner may be configured to determine at least one further display component with an associated location relative to an apparatus display and the at least one display element; and the visual component locator may be configured to determine the location of the at least one further display component on the display dependent on the orientation of the display and the at least one display element.

The visual component determiner may be configured to determine a further indicator located adjacent to and surrounding the display; and the visual component locator may be configured to illuminate and/or activate the at least one indicator dependent on the orientation of the display.

A computer program product stored on a medium for causing an apparatus to may perform the method as described herein.

An electronic device may comprise apparatus as described herein.

A chipset may comprise apparatus as described herein.

SUMMARY OF FIGURES

For better understanding of the present invention, reference will now be made by way of example to the accompanying drawings in which.

DESCRIPTION OF EXAMPLE EMBODIMENTS

The application describes apparatus and methods of controlling user interface components with regards to touch screen devices and in some embodiments capable of audio generation through the screen or display.

Figure 1:
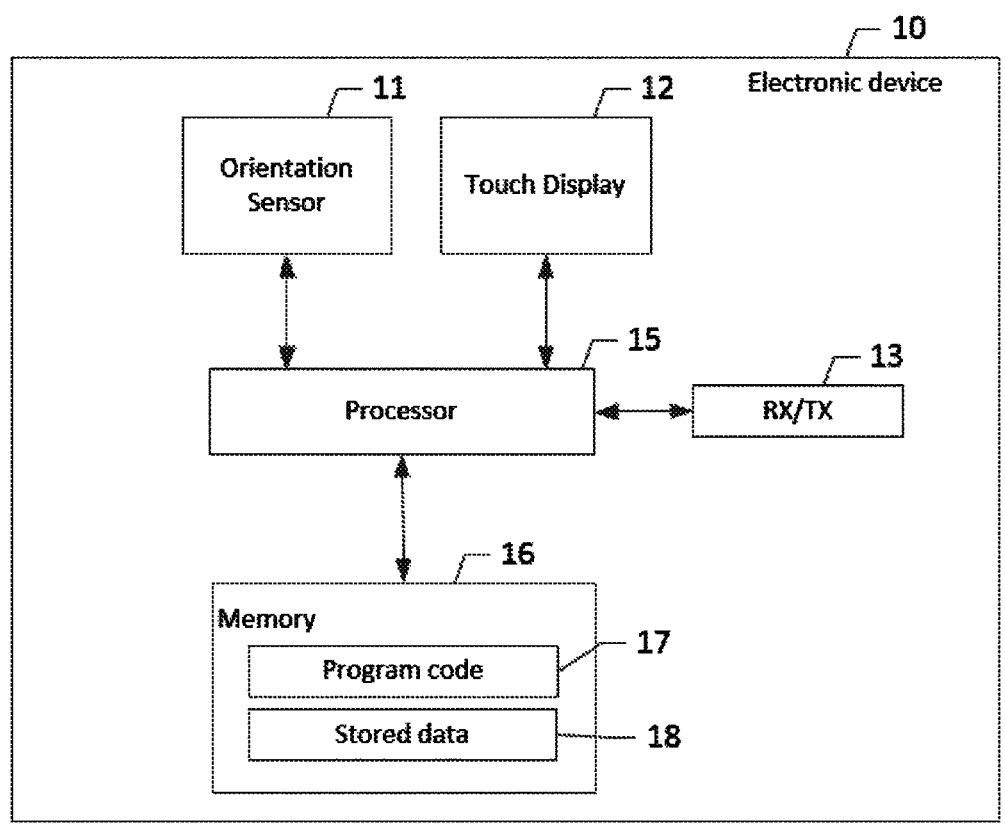
FIG. 1 shows schematically an apparatus suitable for employing some embodiments.

With respect to FIG. 1 a schematic block diagram of an example electronic device 10 or apparatus on which some embodiments can be implemented. The apparatus 10 is such embodiments configured to provide improved haptic feedback and audio generation.

The apparatus 10 is in some embodiments a mobile terminal, mobile phone or user equipment for operation in a wireless communication system. In other embodiments, the electronic device is any suitable electronic device configured to provide a image display, such as for example a digital camera, a portable audio player (mp3 player), a portable video player (mp4 player). In other embodiments the apparatus can be any suitable electronic device with touch interface (which may or may not display information) such as a touch-screen or touch-pad configured to provide feedback when the touch-screen or touch-pad is touched. For example in some embodiments the touch-pad can be a touch-sensitive keypad which can in some embodiments have no markings on it and in other embodiments have physical markings or designations on the front window. The user can in such embodiments be notified of where to touch by a physical identifier—such as a raised profile, or a printed layer which can be illuminated by a light guide.

The apparatus 10 comprises a touch display module 12. The touch display module in some embodiments includes an input module or user input interface, which is linked to a processor 15. In some embodiments the touch display module further includes a display, suitable for displaying to the user images which is also coupled to the processor. In some embodiments the touch display module 12 further includes an acoustic display module suitable for generating the acoustic waves required by the apparatus (for example to simulate the earpiece or integrated hands free transducer). It would be understood that in some embodiments the touch display module can be configured to determine not only a physical touch but also hovering touch where the finger or touching part is close to but not in physical contact with the module.

The processor 15 is further linked to a transceiver (TX/RX) 13 and to a memory 16.

In some embodiments, the touch display module 12 is separate or separable from the electronic device and the processor receives signals from the touch input module 11 and/or transmits and signals to the display 12 via the transceiver 13 or another suitable interface.

The processor 15 can in some embodiments be configured to execute various program codes. The implemented program codes, in some embodiments can comprise such routines as user interface control and configuration code, and touch capture code where the touch input module inputs are detected and processed, display image processing and image interaction code where the data to be passed to generate the display images is generated for example based on the detection of the orientation of the apparatus, or actuator processing generating an actuator signal for driving an actuator. The implemented program codes can in some embodiments be stored for example in the memory 16 and specifically within a program code section 17 of the memory 16 for retrieval by the processor 15 whenever needed. The memory 16 in some embodiments can further provide a section 18 for storing data, for example data that has been processed in accordance with the application, for example display information data.

The touch display module 12 can in some embodiments implement any suitable touch screen interface technology. For example in some embodiments the touch screen interface can comprise a capacitive sensor configured to be sensitive to the presence of a finger above or on the touch screen interface. The capacitive sensor can comprise an insulator (for example glass or plastic), coated with a transparent conductor (for example indium tin oxide—ITO). As the human body is also a conductor, touching the surface of the screen results in a distortion of the local electrostatic field, measurable as a change in capacitance. Any suitable technology may be used to determine the location of the touch. The location can be passed to the processor which may calculate how the user's touch relates to the device. The insulator protects the conductive layer from dirt, dust or residue from the finger.

In some other embodiments the touch input module can be a resistive sensor comprising of several layers of which two are thin, metallic, electrically conductive layers separated by a narrow gap. When an object, such as a finger, presses down on a point on the panel's outer surface the two metallic layers become connected at that point: the panel then behaves as a pair of voltage dividers with connected outputs. This physical change therefore causes a change in the electrical current which is registered as a touch event and sent to the processor for processing.

In some other embodiments the touch input module can further determine a touch using technologies such as visual detection for example a camera either located below the surface or over the surface detecting the position of the finger or touching object, projected capacitance detection, infra-red detection, surface acoustic wave detection, dispersive signal technology, and acoustic pulse recognition.

The touch display module 12 may comprise any suitable display technology. For example the display element can be located below the touch input module and project an image through the touch input module to be viewed by the user. The touch display module 12 can employ any suitable display technology such as liquid crystal display (LCD), light emitting diodes (LED), organic light emitting diodes (OLED), plasma display cells, Field emission display (FED), surface-conduction electron-emitter displays (SED), and Electophoretic displays (also known as electronic paper, e-paper or electronic ink displays). In some embodiments the display 12 employs one of the display technologies projected using a light guide to the display window.

The apparatus 10 can in some embodiments be capable of implementing the processing techniques at least partially in hardware, in other words the processing carried out by the processor 15 may be implemented at least partially in hardware without the need of software or firmware to operate the hardware.

The transceiver 13 in some embodiments enables communication with other electronic devices, for example in some embodiments via a wireless communication network.

In some embodiments, the apparatus comprises an orientation sensor 11. The orientation sensor 11 can be any suitable orientation sensor. The orientation sensor can in some embodiments be part of a position sensor configured to estimate the position of the apparatus. The position sensor can in some embodiments be a satellite positioning sensor such as GPS (Global Positioning System), GLONASS or Galileo receiver.

In some embodiments, the positioning sensor can be a cellular ID system or assisted GPS system.

In some embodiments, the orientation sensor can be any suitable orientation sensor. For example, in some embodiments the orientation sensor can be an electronic compass, an accelerometer, a gyroscope or be determined by the motion of the apparatus using the positioning estimate (in other words, dead reckoning).

Figure 4:
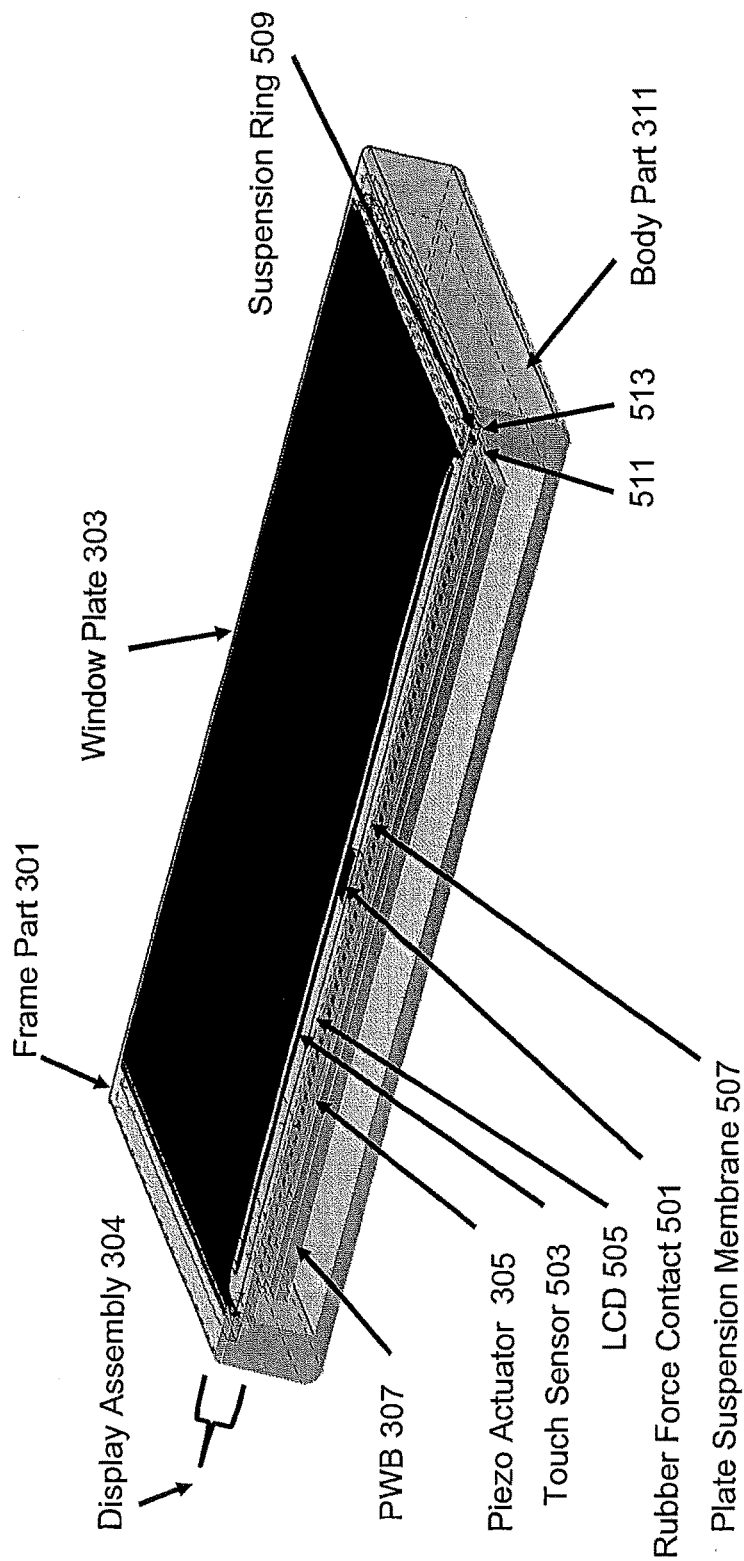
FIG. 4 shows an example apparatus configuration display according to some embodiments.

With respect to FIG. 4 an assembled view of an example apparatus within which embodiments of the application can be implemented is shown. The apparatus 10 can comprise a body part 311 or outer frame which can be constructed from any suitable material and is configured to provide a structure to which other components may be coupled and/or may protect other components from damage. In some embodiments the body part 311 can comprise an inner surface to which internal components are located and an outer surface to which external components are located and which is exposed to the elements. In some embodiments the junction between the inner surface and the outer surface is connected via a filet or chamfer to smooth the junction. In such embodiments by smoothing the junction there is less chance of damaging other components.

The apparatus 10 in some embodiments comprises a battery. The battery can be any suitable electrical power generating means and can employ any suitable electrical charge storage or generating technology, for example but not exclusively lithium polymer cells, fuel cell, solar cell or a combination of suitable technologies. In some embodiments the battery is rechargeable or refillable and is connected via a port in the body part 311 to be able to receive a recharging or refilling coupling, for example a recharger plug to couple to a recharging socket for supplying power to recharge the battery. In some embodiments the battery 309 is configured to be located within the body part 311. For example the body part 311 can in some embodiments employs moulding tabs or other locating means on the inner surface to fix or locate the battery in position.

In some embodiments the apparatus 10 further employs a printed wiring board (PWB) 307. The printed wiring board 307 is configured to provide a suitable structure for locating electrical components. For example in some embodiments the processor 15, transceiver 13 and memory 16 shown in FIG. 1 can be located on the printed wiring board. In some embodiments there can be employed more than one printed wiring board 307 layer. Furthermore in some embodiments the printed wiring board 307 can be replaced by a printed circuit board (PCB) or surface mounted board suitable for locating surface mounted electrical components on it. In some embodiments the printed wiring board 307 is configured to be coupled to the battery 309 whereby the battery 309 is configured to supply the printed wiring board 307 with power to operate the electrical components located on it. In the example shown in FIG. 4 the printed wiring board is located over the battery and within the body part 311. It would be understood that in some embodiments the body part 311 can employ moulding tabs or other locating means on the inner surface to fix or locate the printed wiring board in position.

The apparatus 10 further comprises at least one piezoelectric actuator 305. In the example shown in FIG. 2 the apparatus employs a first piezoelectric actuator 305 located towards one end of body part 311 and a second piezoelectric actuator 305 located at the opposite end of the body part 311. The piezoelectric actuator 305 is in some embodiments coupled to receive power from the battery 309 via the printed wiring board 307 and to produce a physical moment or force in response to a current passed through the piezoelectric actuator 305.

Each piezoelectric actuator 305 furthermore as can be seen in FIG. 4 can in some embodiments be located within the case body by an inner recess 511 which is configured to receive the piezoelectric actuator 305. The inner recess 511 is configured to locate either end of the piezoelectric actuator 305 in position such that in some embodiments when the piezoelectric actuator 305 is operated the ends of the piezoelectric actuator are fixed nodes. Furthermore as shown in FIG. 4 the piezoelectric actuator 305 in some embodiments is suspended at each end by the body part 311 recess 511 such that when a current is applied the piezoelectric actuator 305 flexes and can 'push' against the case body thus producing a motion in and away from the direction of the display. In other words where the display is considered to be in a plane designated the X-Y axis the actuations of the piezoelectric actuator to actuate or produce a force in a "Z" dimension or direction. In some embodiments there is configured to be a suitable air gap between the piezoelectric actuator 305 and the printed wiring board 307 in order to prevent 'clipping' of the actuation of the piezoelectric actuator 305.

Although the following examples are described with respect to the use of a piezoelectric actuator 305 it would be understood that any suitable actuator capable of producing a translational force to a display could be implemented in some further embodiments. For example in some other embodiments an eccentric mass can be employed to produce a force which may be passed. In further examples a moving coil or moving magnet actuator can generate the force. Furthermore in some embodiments the piezoelectric actuator or suitable actuator means are powered by electrical signals from an amplifier or suitable amplification means. In some embodiments the amplifier or amplification means is configured to receive an input from the processor 15 and output a suitable drive signal to the actuator means.

In some further embodiments the display can directly experience the force which is transmitted from the piezoelectric actuator to the display assembly 304 in such a manner to permit a planar motion of the display assembly. For example in some embodiments the piezoelectric actuator is shaped with a suitable thickening to in a central portion to provide a projection through which force can be passed to a display.

In some embodiments the piezoelectric actuator 305 is further coupled via a conductive soft surface mounted technology (SMT) pad to the printed wiring board (PWB) which provides an electrical coupling between the piezoelectric actuator 305 and the printed wiring board 307.

The apparatus 10 can in some embodiments comprise a rubber force contact 501. The rubber force contact is configured to be located on or be in contact with the piezoelectric actuator 305 approximately half way along the length of the actuator and translate the bending motion of the piezoelectric actuator to produce a linear or planar movement of a display assembly. In such embodiments the rubber force contact 501 can be manufactured from any suitable material, such as natural rubber, synthetic rubber, or plastic being capable of transmission of force in a direction. In some embodiments the rubber force contact 501 can be designed to provide a degree of buffering of force or 'damping' between the piezoelectric actuator 305 and the display so to prevent the display experiencing shock and/or damage when the piezoelectric actuator 305 is driven. The rubber force contact 501 or other force damping means furthermore can in some embodiments by damping the force furthermore reduce any bending moment experienced by the display.

The apparatus 10 can in some embodiments further comprise a display 304 or display assembly. The display 304 can comprise any suitable display technology as described herein.

In some embodiments the display 304 is configured to employ a flexible membrane or plate suspension membrane 507. The example shown in FIG. 4 shows the flexible membrane being located in contact or substantially in contact with the rubber force contact and suspended at least partially at a periphery of the flexible membrane 507 between the frame part 301 and body part 311. In some embodiments as shown in FIG. 4 the flexible membrane 507 is sandwiched at the periphery of the membrane between the body part 311 and the frame part 301 and located by a suspension ring 509 attached to the flexible membrane 507 and located within a suspension ring recess 513 formed on the inner surface of the body part 311. In some embodiments the suspension ring 509 can be formed as a substantially thickened section of the flexible membrane 507. In some embodiments the display 304 can be suspended by any suitable suspension means. For example in some embodiments the display is suspended using a glass or metal suspending member. In some embodiments the display can be acoustically porous and the transducer means behind the display configured to move to generate the generated acoustic waves pass through the display which is substantially rigidly suspended.

In some embodiments the inner surface of the body part 311 can be attached to the flexible membrane 507 via an adhesive layer. In some embodiments the adhesive layer extends beyond the static area of contact between the inner surface of the body part 311 and the flexible membrane 507 in order to provide additional protection at any dynamic area of contact between the inner surface of the body part 311 and the flexible membrane 507. The flexible membrane 507 in some embodiments may be manufactured from an elastomer. The elastomer in some embodiments may be any suitable film or foil. For example the suitable film or foil may be in various embodiments a polyethylene terephthalate (PET) film, a polycarbonate (PC) foil, or a silicone foil.

The flexible membrane 507 in such embodiments can furthermore be attached via a further adhesive layer to a surface of the frame part 301. The body part 311 and the frame part 301 thus in these embodiments locates at least some of the flexible membrane. In some embodiments the junction between the surfaces of body part 311 and the frame part 301 are configured with a fillet or chamfer to smooth the junction for a similar reason as above for protecting the membrane while the membrane is dynamic. Similarly in some embodiments the further adhesive layer may extend beyond the static area of contact to provide additional protection at any dynamic area of contact.

The flexible membrane 507 can be constructed out of polyethylene terephthalate (PET) polyester film. In some embodiments the film can be biaxially oriented polyethylene terephthalate which may be used because of its high tensile strength, chemical and dimensional stability, transparency and also electrical insulation properties. The PET flexible membrane 211 can be constructed by any suitable means. For example the PET layer may be constructed by extrusion onto a chill roll which quenches it into an amorphous state. The PET flexible membrane layer furthermore in some embodiments can be constructed in such a way that the crystallites grow rapidly but reach the boundary of neighbouring crystallites and remain smaller than the wavelength of visible light and thus produce a film having excellent clarity.

In some embodiments the display assembly can further comprise a display element 505. The display element 505 can in some embodiments comprise a static display array located beneath the front window 303 and projected up to the user through the front window 303.

The graphic layer can comprise any suitable material for blocking projected light. Furthermore in some embodiments the graphic layer can be printed directly onto the underside of the front window 303. In some other embodiments, for example where the display element 505 is a dynamic display, the graphic layer can comprise any suitable material for permitting the controllable and selectable projection of light—for example a liquid crystal display element and colour filter layer, E-ink etc.

The graphic layer can in some embodiments be coupled to the flexible membrane 507 via an optically clear adhesive (OCA) layer.

The static display array in some embodiments can also comprise a graphic layer which may be connected to the front window 303 by a first optically clear adhesive (OCA) layer.

The display assembly 304 in some embodiments further comprises a touch sensor 503 for example a capacitive touch sensor located over the display element 503.

The capacitive touch sensor can in some embodiments comprise a series of layers. The layers in the capacitive touch sensor can comprise at least one Indium Tin Oxide on PET layer, and a protective hard coated PET layer. Each layer can in some embodiments be fixed to the neighbouring layers by the use of an optically clear adhesive to form a sandwich of layers.

The display element 505 for example can in some embodiments be connected via a second layer of optically clear adhesive (OCA) to a first layer of indium tin oxide (ITO) on PET.

The first layer of indium tin oxide (ITO) on PET in some embodiments is the first of the capacitive touch interface 203 layers. In other words the first ITO on PET layer provides a first layer capable of detecting the capacitive coupling produced by the user's finger when it touches the front window 303.

The first layer of ITO on PET layer can be connected to a second ITO on PET layer via a third layer of optically clear adhesive (OCA).

The second layer of ITO on PET can in some embodiments be a further layer capable of detecting the capacitive coupling produced by the user's finger when it touches the front window 303.

Although the capacitive touch interface layers have been described as being ITO on PET layers it would be understood that the capacitive touch interface layers may comprise any suitable material, for example ITO on glass.

In some embodiments the display comprises a protective or front window 303.

The front window 303 can in some embodiments be manufactured from glass. In some embodiments the glass may be coated with optical (to reduce glare) or oleophobic (to resist fingerprints) films to enhance the characteristics of the front window. The front window 303 can in some embodiments overlay the other display components and is configured to protect the other display components.

In some other embodiments the front window 303 can be manufactured from a plastic or other protective screen material suitable for both enabling the other components from performing their tasks and protecting the other components from physical or other damage. For example the front window 303 can in some embodiments provide a dielectric material between a capacitive touch interface touch sensor 503 and the user's finger, while the front window 303 is also sufficiently transparent to permit any display elements under the window being seen by the user.

The front window 303 for example as shown in FIG. 4 covers the touch sensor 503 and in some embodiments can be connected by a further layer of optically clear adhesive. In some embodiments the profile of the glass could be flat, 2.5D, 3D or curved.

Although the above example is shown where the touch sensor 501 covers the display element 503 which lies on the flexible membrane layer 507 it would be understood that the layers could be reordered into any suitable arrangement.

Furthermore in some embodiments the display element 505 can employ further layers such as a light guide layer for projecting a light towards the user. The light guide layer can be formed from any suitable material for conveying a light from a light source (not shown) and projecting the light to the user. In some embodiments the light guide can diffuse the light to produce a more pleasing display image.

Furthermore in some embodiments the display element can employ a hard coated PET layer which can provide both support for and protect the display and/or flexible membrane from physical damage.

In some other embodiments the display element 505 is not a filtering display where a uniform (or generally uniform) light source is filtered to produce an image but may be a generated display such as an light emitting diode (LED) or active matrix organic light emitting diode (AMOLED) display.

In some embodiments the flexible membrane layer 507 can be manufactured as one of the other above described PET films. For example the flexible PET membrane may be an extension of one of the ITO on PET layers extended beyond the shape of the touch sensor to enable it to be fixed to the case. In such embodiments the ITO on PET layer may thus be both the flexible membrane and be sensitive to capacitive changes.

Although the above examples feature the flexible membrane as a PET layer it would be understood that any suitable material may be employed. For example in some embodiments the flexible membrane may be formed by a polycarbonate layer.

The flexible membrane 507 can be in some embodiments considered to be a laminar film or layer which is located at least at some contact area to an inner part comprising at least one of the window, touch sensor and display element and at least at some other contact area to the outer part comprising at least one of the frame or body part. The flexible membrane 507 furthermore in these embodiments maintains a flexible connection between the inner part and the outer part. In other words the flexible membrane 507 is configured in these embodiments to be flexible in that it is elastic in nature such that when pressure is applied to the front window 303 the flexible membrane 507 can move or flex relative to the frame or body part and thus the inner part can move relative to the outer part.

Furthermore the flexible membrane layer 507 in such embodiments can permit without undue damping the transmission of force generated by a piezoelectric actuator 305 such as a force of 1 to 2 N to the display assembly 304 can be sensed by the user.

Furthermore the flexible membrane 507 together with the rubber force contact 501 in some embodiments can further limit the motion of the inner part relative to the outer or peripheral part. The flexible membrane 507 and the rubber force contact 501 may therefore prevent the inner part 251 from 'hovering'. Hovering is an effect experienced by a user where when the inner and outer parts can move laterally as well as vertically with respect to each other. This for example is found in systems where gaskets wear or are loose and thus produce a slipping, tipping or rolling motion of the inner part relative to the peripheral part. This effect is especially noticeable in large touch interfaces and touch screen displays. This hovering may not only be unpleasant to interact with as the button press feels broken, but may vibrate and generate a buzzing or noise which would lead the user to think that the product was faulty or sub-standard. The flexible membrane 507 in some embodiments thus may generate no or only negligible damping force on the inner part nor transmit any or only negligible force to the case through the membrane to limit any case vibration.

The flexible membrane 507 is preferably light and does not therefore produce significantly more undamped weight in addition to the mass of the suspended display assembly to be moved by the piezoelectric actuator 305. In some embodiments the elasticity or flexibility of the flexible membrane 507 is such that it enables a vertical or sheer displacement of the display assembly with respect to the body part 311/frame part 301 such that the user experiences a response similar to that of pressing a physical key or button.

In some embodiments the piezoelectric actuator 305 can be modulated in such a way that the modulation transmitted via the flexible membrane laminar to the display 304 causes the display 304 to generate audible oscillations. In other words in some embodiments the display can be used as a flat panel speaker structure where the flexible membrane 305 provides sufficient damping (but not under-damping or over-damping) in the transmission of the piezoelectric actuated vibration to the display 304.

In some further embodiments, the flexible membrane 507 is applied across the apparatus extending to thus provide a dust and moisture proof seal protecting the delicate electronic circuitry and mechanical components from water, dust, or other materials.

Furthermore the apparatus 10 comprises a frame part 301 configured to locate the display assembly 304 in relation to the body part 311 as described herein.

The display assembly 304 thus can produce a sufficient air displacement to generate audio signals with sufficient amplitude to implement not only earpiece operations but also to provide speaker operations such as for example hands free speaker operations.

Furthermore as in some embodiments there are no magnetic parts required there are no issues concerning metal dust or other contaminants. Furthermore as the flexible membrane, frame part and body part can in some embodiments form a seal the whole system is easy to seal from moisture and dust as no sound holes are required and apparatus can be easily weather proofed. Furthermore in embodiments by using the display assembly as both display and air mass driver no internal audio transducers are required thus reducing required volumes and space and allowing thinner and more aesthetically pleasing products to be designed.

Figure 2:
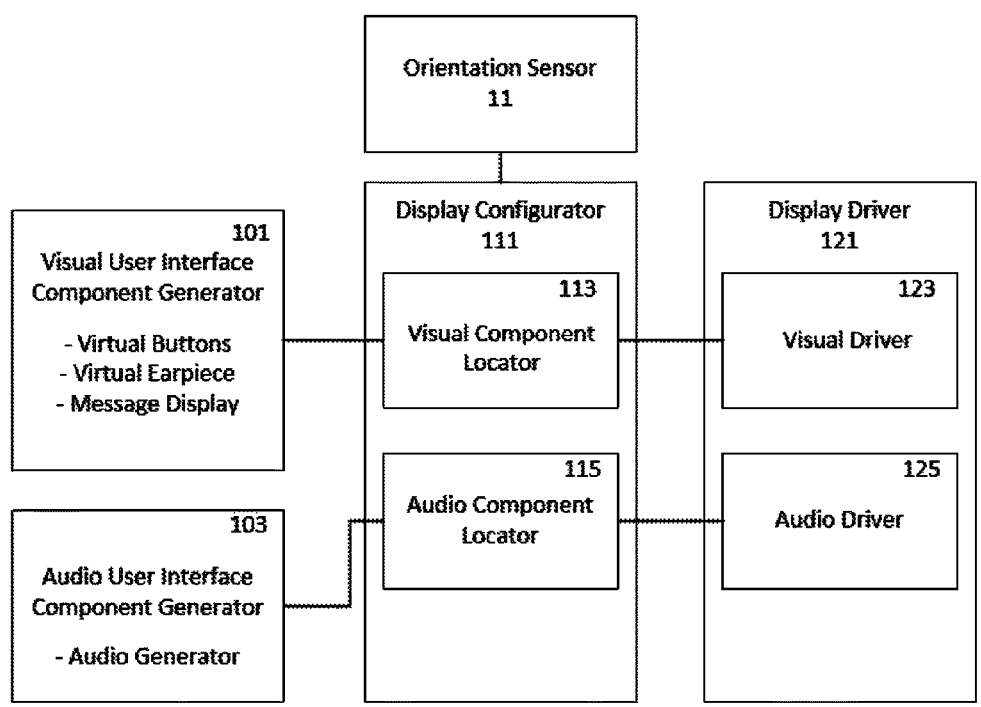
FIG. 2 shows schematically a user event interface control apparatus according to some embodiments.

With respect to FIG. 2, an example user interface control apparatus according to some embodiments is shown. With respect to FIG. 3 a flow diagram showing the operation of the user interface control apparatus is shown.

In some embodiments, the user interface control apparatus comprises a visual user interface component generator 101. The visual user interface component generator 101 in some embodiments is configured to determine which components are required for the visual elements of the user interface.

An example of a visual element component is a 'virtual button'. A virtual button can for example be used to replace a physical button or key. Further examples of types of visual element components can be images such as a background image or a virtual earpiece image. A virtual earpiece image is an image displayed by the visual display to indicate to a user where the location of an "earpiece" speaker is so that the user orientates the device correctly in order to use the device. Further types of visual element components can be messages, for example an incoming call message.

In some embodiments, the visual user interface component generator 101 can in some embodiments be configured to further determine any parameters which are associated with the visual element component, such as for example: an absolute or relative position request, whether the visual element component is fixed or floating, and any other visual aspects of the visual element component such as colour, shape, font type and size.

The visual user interface component generator can be configured to output the component requirements to a display configurator 111 and in some embodiments to a visual component locator 113.

Figure 3:
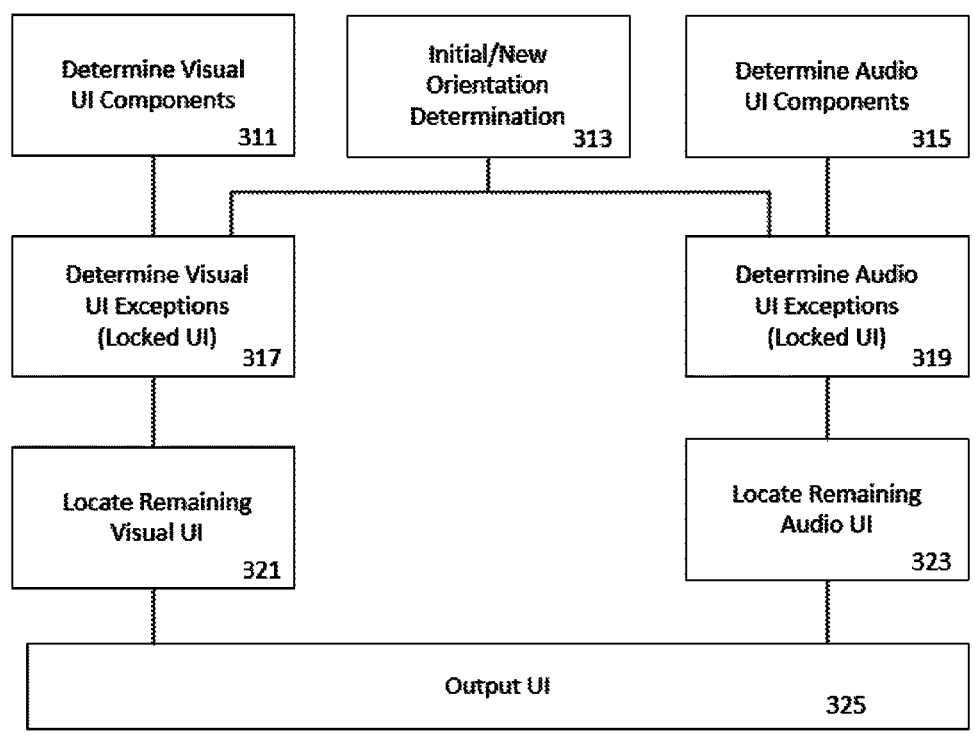
FIG. 3 shows a flow-diagram of the operation of the user interface control apparatus as shown in FIG. 2 according to some embodiments.

The operation of determining the visual user interface components is shown in FIG. 3 by step 311.

In some embodiments, the user interface control apparatus comprises an audio user interface component generator.

The audio user interface component generator 103 can in some embodiments be configured to determine where the user interface audio components are to be displayed. For example, in an apparatus where the user audio interface components are located behind the display, or part of the display such as in a flat panel display with audio flat panel generating capacity as described herein the touch display module can be configured to generate acoustic output from a specific area of the display emulating the output from an earpiece module. The audio user interface component generator can for example determine whether the acoustic wave output emulating the earpiece module is required and any parameters associated with the audio element component. For example the audio element component absolute or relative location on the display, whether the audio element component is floating or fixed and under what circumstances that the audio element component is floating or fixed.

The audio user interface component generator 103 can be configured in some embodiments to output the determined components to the display configurator 111 and specifically in some embodiments to an audio component locator 115.

The operation determining the audio user interface components is shown in FIG. 3 by step 315.

The orientation sensor 11 can furthermore be configured to monitor and output an indication of the orientation of the apparatus. In some embodiments this indication can be an indication of which section of the touch display module 12 is located highest or an up orientation indication whereas in some embodiments the orientation indication can be with respect to determining a northerly or other compass direction.

The output of the orientation sensor 11 can be passed to the display configurator 111.

The operation of determining an initial or new orientation of the apparatus is shown in FIG. 3 by step 313.

In some embodiments, the user interface control apparatus comprises a display configurator 111. The display configurator 111 in some embodiments is configured to receive the visual element component and audio element components together with any parameters determined with them such as positioning on the display. The display configurator 111 furthermore in some embodiment receives the orientation of the apparatus information from the orientation sensor 11. The display configured in some embodiments to determine the actual location/rotation on the touch display 12 for the visual element components and audio element components.

In some embodiments the display configurator 111 comprises a visual component locator 113 configured to receive the visual element components (such as virtual buttons, virtual earpiece display, message display, and background display images) and based on the orientation information determine the location of the visual location components on the display.

In some embodiments, the visual component locator 113 initially determines whether or not any of the visual element component have associated with them an orientation exception, in other words whether the component is fixed or floating.

Where the visual element component can be a fixed component then any conditions associated with the fixing are examined to determine whether the component in this circumstance is to be fixed. For example, where there are three virtual button visual element components which are defined as being located at the 'bottom' surface or edge of the display, there may be an associated indication that when the apparatus is operating as a mobile phone and is actively making or receiving a call then the virtual buttons are to be fixed so that the user 'knows' where the buttons are when the apparatus is held against the head.

Where the visual component locator 113 determines the visual element component is fixed the visual component locator can then 'locate' the visual element component dependent on the original requested location of the visual element component received from the visual user interface component generator 101. In the virtual button example discussed herein when the apparatus is being used for a telephone call or located against the head then the visual component locator 113 determines that the current location of the virtual buttons is to be maintained.

The operation of determining the visual user interface exceptions (locked or fixed visual element components) is shown in FIG. 3 by step 317.

The visual component locator 113 can then be configured to locate the remaining visual element components dependent on the orientation sensor information.

For the virtual button example discussed herein, when the apparatus is not being used to make or receive a call then the visual component locator 113 can be configured to change the location of the virtual buttons based on the orientation information such that they are always located at the bottom of the display whichever way the apparatus is being held.

The visual component locator 113 can output the visual user interface component and the location of the visual components to the display driver 121 and specifically in some embodiments a visual driver 123.

The locating of the remaining visual user interface components is shown in FIG. 3 by step 321.

In some embodiments, the display configurator 111 comprises an audio component locator 115. The audio component locator 115 can be configured in some embodiments to receive the audio element components and based on the orientation information determine the location of the audio location components on the display.

In some embodiments, the audio component locator 115 initially determines whether or not any of the audio element component have associated with them an orientation exception, in other words whether the component is fixed or floating.

Where the audio element component can be a fixed component then any conditions associated with the fixing are examined to determine whether the component in this circumstance is to be fixed. For example, where there is a 'virtual' or emulation of an earpiece speaker audio element component which are defined as being located at the 'top' surface or edge of the display, there may be an associated indication that when the apparatus is operating as a mobile phone and is actively making or receiving a call then the virtual earpiece is to be fixed so that the speaker does not move.

Where the audio component locator 115 determines the audio element component is fixed the audio component locator can then 'locate' the audio element component dependent on the original requested location of the audio element component received from the audio user interface component generator 103. In the virtual earpiece speaker example discussed herein when the apparatus is being used for a telephone call or located against the head then the audio component locator 115 determines that the current location of the virtual earpiece speaker is to be maintained.

The operation of determining the audio user interface exceptions (locked or fixed visual element components) is shown in FIG. 3 by step 319.

The audio component locator 115 can then be configured to locate the remaining audio element components dependent on the orientation sensor information.

For the virtual earpiece speaker example discussed herein, when the apparatus is not being used to make or receive a call then the audio component locator 115 can be configured to change the location of the virtual earpiece speaker based on the orientation information such that the speaker location is always at the top of the display whichever way the apparatus is being held.

The location of the remaining audio user interface components is shown in FIG. 3 by step 323.

The audio component locator 115 can in some embodiments output this information to the display driver 121 and specifically in some embodiments, the audio driver 125.

In some embodiments, the apparatus comprises a display driver 121. The display driver 121 is configured to receive the visual and audio component locations and output a suitable signal to the display to provide these at the locations requested.

The display driver in some embodiments, comprises a visual driver 123 configured to receive the visual element components of the user interface and the locations of the visual user interface components and output a signal to the display such that the display is able to output visual representations of the required form and orientation and location.

Similarly in some embodiments, the display driver can comprise an audio driver 125 configured to output the audio user interface components is the requested location.

The operation of outputting the user interface components is shown in FIG. 3 by step 325.

In some embodiments the visual and/or audio element components can be configured to indicate where the visual and/or audio element component is required to perform any of the following options: rotate with the device (in other words maintain a continuous floating display), to be fixed to at a number of orientations (this would typically be four possible orientations—up, down, left and right), rotate with the device to a subset of the number (four) of possible orientations (for example only both the portrait orientations but not the landscape orientations or vice versa).

In some embodiments the rules defining the visual element components and the audio element components can differ. For example a phone call application user interface may define with respect to the audio UI component generator 103 a virtual earpiece speaker to a specific piezo actuator and therfore fix the audio element component to this location independent of the orientation wherein the visual element components can be moved dependent on the orientation. Thus for example if the user during a call starts browsing with the browser or writing an text message, then the text window or browsing window can be permitted to rotate with the apparatus even though there is a phone call in the background.

In some embodiments there can be located adjacent to and surrounding the display analogue or illuminated keys/buttons. In some such embodiments where these keys/buttons could be designed around the display and controlled such that they are activated/illuminated relative to display orientation, so that for example only the relative keys are active/visible depends on the orientation.

In some embodiments the audio element component can be a virtual integrated loudspeaker audio element component. In such embodiments the video and audio component locators can be configure to release or "free" the visual component elements for example where the user changes the phone call from earpiece routing to integrated handsfree speaker or some other suitable configuration such as separate bluetooth headset operation.

In some embodiments where the at least one audio component is selected relative to display orientation and a further audio component is selected when the apparatus/display orientation is substantially changed. For example when someone is using the phone on the right ear and whilst moving the phone to the left ear the orientation is changed upside down, In such embodiments it can be configured so that changing transducer allocation is not performed for small orientation changes but only when the orientation is substantially changed.

Figure 5:
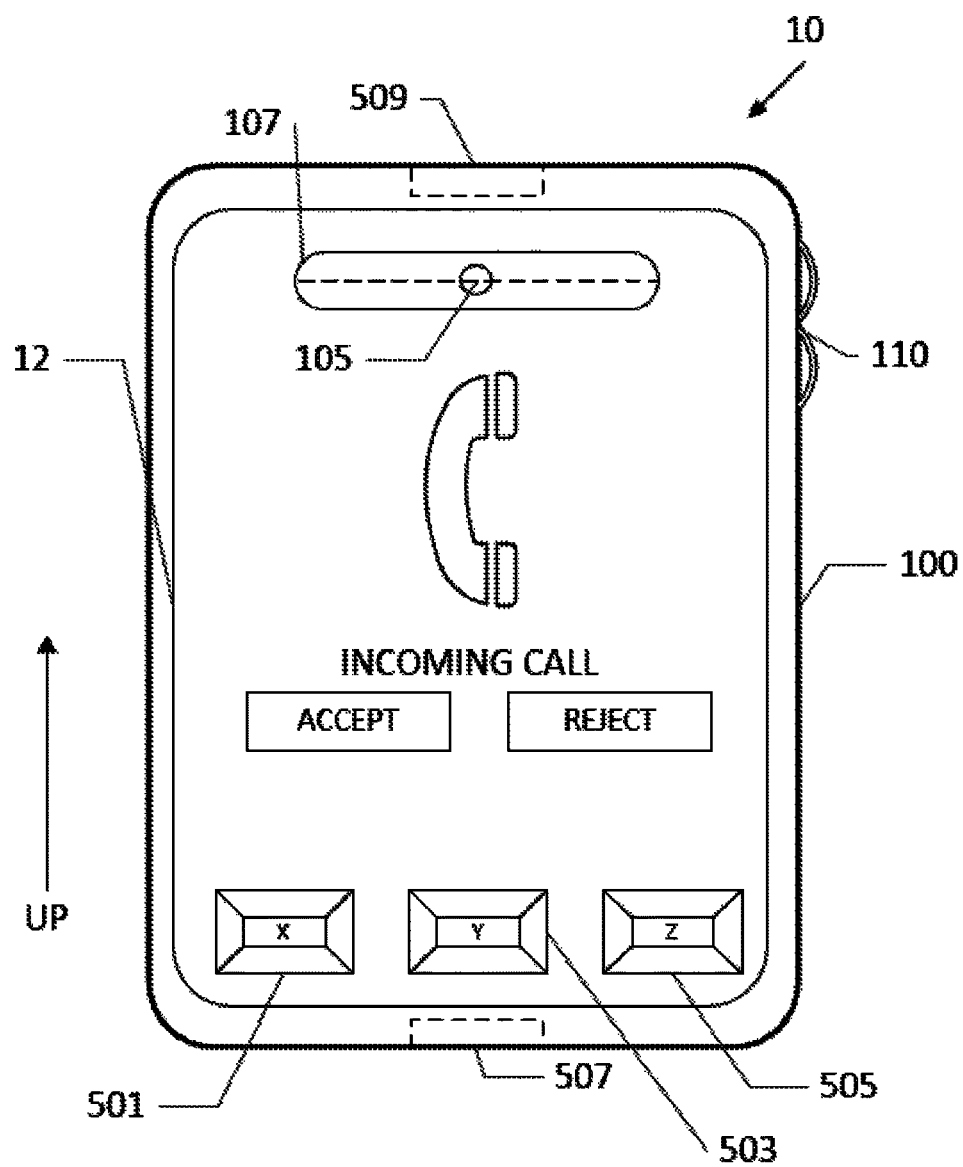
FIGS. 5 to 8 show example orientation arrangements according to some embodiments.

Furthermore in some embodiments the apparatus includes at least two microphones. In the example shown in FIG. 5 there are two microphones 507, 509 at opposite ends of the apparatus. In such embodiments one microphone is configured to operate as the 'active' acoustic signal capture or audio signal generating means such as generating an audio signal substantially for voice communication purposes and the other microphone is configured to operate as the 'noise' acoustic signal capture or audio signal generating means such as generating an audio signal substantially representing the background noise and used in noise suppression or cancellation operations for voice communication purposes. It would be understood that in some embodiments the display configurator 111 can be configured to select at least one of the microphones to operate as the 'active' microphone while at least one of the remainder of the microphones is configured to operate as the 'noise' microphone dependent on the orientation of the apparatus. In other words, for example as shown in FIG. 5, in some embodiments the display configurator 111 or suitable microphone selection means can be configured to select the microphone from the microphones on the apparatus which is the 'down' microphone 507 due to the orientation as the active microphone for voice call signals. Furthermore, as also shown in FIG. 5, the display configurator 111 or suitable microphone selection means can be configured to select the microphone from the microphones on the apparatus which is the 'up' microphone 509 due to the orientation as the noise microphone for noise suppression and/or cancellation operations. Furthermore in some embodiments the display configurator 111 or suitable orientation control means can furthermore be configured to control other functions of the apparatus based on the orientation information. For example in some embodiments the apparatus can comprise at least one of: an ambient light sensor, proximity detector or front facing camera. These components can in some embodiments be located to one end of the apparatus and as such any rotation or orientation of the apparatus other than the 'normal' orientation can cause the display configurator 111 to control or process the output of the component in suitable manner.

Figure 6:
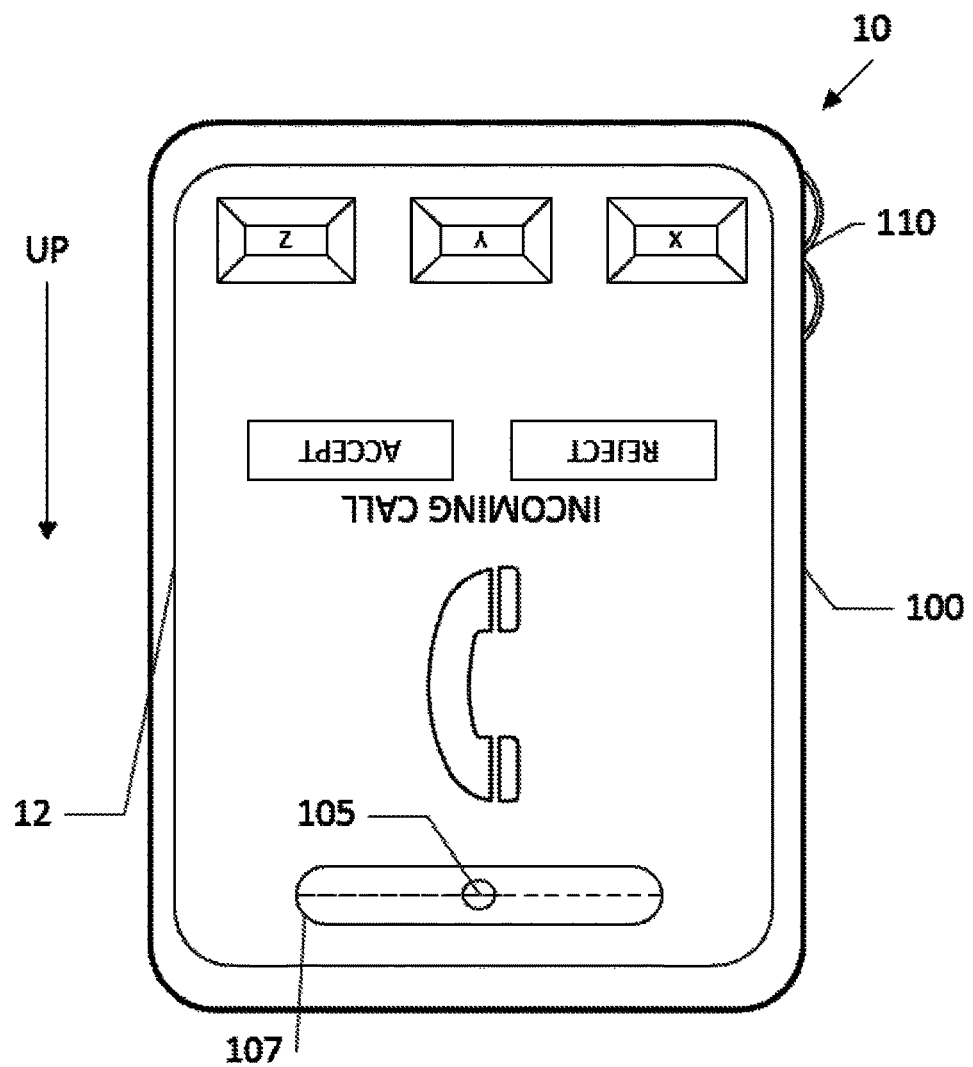
Figure 7:
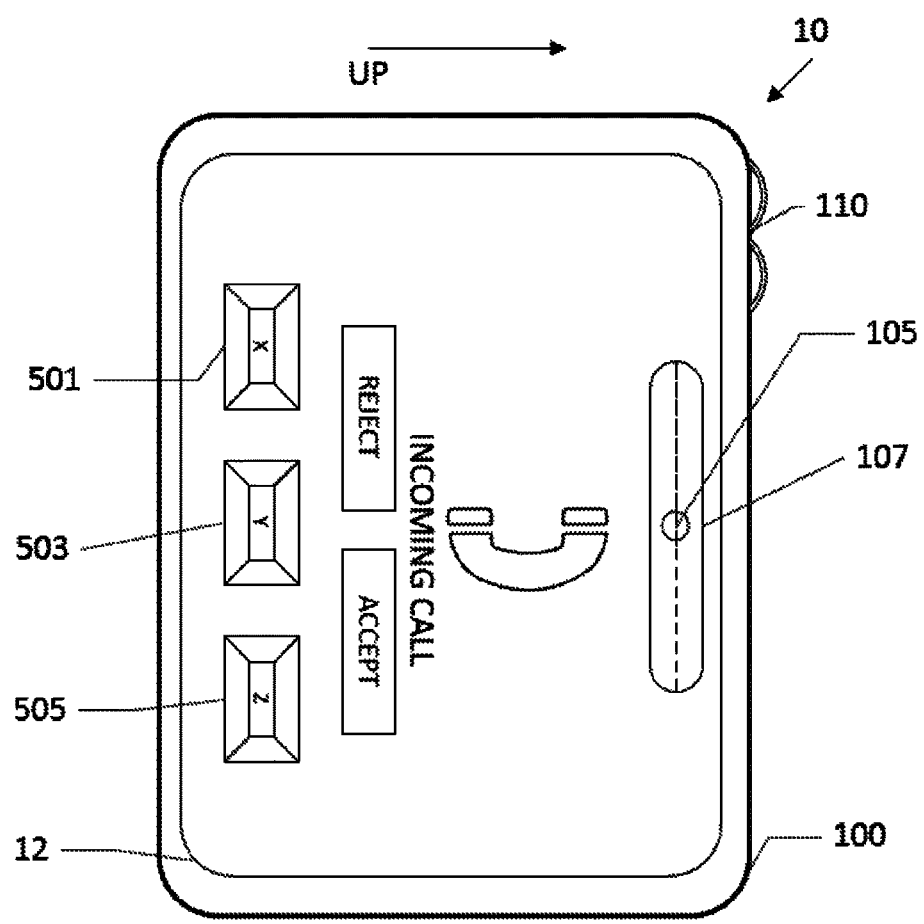

With respect to FIGS. 5, 6 and 7, an example orientation of the display user interface with respect to the orientation of the device is shown. In the following examples the device rotation is quantised to 90 degrees in other words providing a layout which is 'up', 'down', 'left' and 'right'. However it would be understood that this is an example and that the configuration can be fully rotatable in other words the device rotation has complete freedom in locating the orientation of the display user interface. Furthermore in some embodiments the device rotation is limited to some defined number of possible orientation ranges. For example in some embodiments the number of possible orientation ranges is defined by the number of possible audio display elements defining virtual earpieces.

The example FIGS. 5, 6 and 7, show virtual buttons X 501, Y 503 and Z 505 which are associated with a request to be always located along the bottom of the display area providing a call is not in operation. It would be understood that although the following examples show three virtual buttons that in some embodiments any suitable number of virtual buttons can be used. Furthermore the apparatus example shown in FIGS. 5 to 7 shows physical volume keys 110 and a camera key 100 so to show the 'normal' up direction. It would be understood that in some embodiments the physical volume keys 110 and camera key 100 can be implemented as virtual buttons on the display.

This can be seen in the examples where the apparatus is orientated differently, and the virtual buttons are displayed such that they can be 90, 180 or 270 degrees different from that shown in FIG. 5.

Similarly the example shown in FIG. 5 shows a display message such as "incoming call" together with associated virtual buttons of "accept call" and "reject call". These messages and virtual buttons are similarly able to be rotated and located according to the orientation of the apparatus.

A further visual element component is shown in FIGS. 5, 6, and 7 of a virtual earpiece display element 107 which is configured to be orientated such that it is always at the top of the apparatus so that it is able to be held against the ear of the user in a conventional manner.

FIGS. 5, 6, and 7 further show a virtual earpiece speaker audio element component 105 associated with the virtual earpiece display element 107. In some embodiments, underneath the display as shown by the audio generator component 105, the display can be used to generate acoustic waves to simulate or emulate the operation of an earpiece module. This can in some embodiments, be similarly orientated to the virtual earpiece location so that it is always at the upmost edge of the display. In some embodiments where the audio generator component 105 is limited to a specific number of locations, for example to the locations over the physical location of the piezoelectric transducers the audio component locator can be configured to locate the audio generator component to the possible location nearest the upmost edge or the 'left' of two possible locations where the locations are substantially the two upmost.

In such embodiments as described herein with a tactile audio display product, there is a possibility that the apparatus can be rotated any way and a call can be answered. This is because the display can be configured in some embodiments to operate as an earpiece. Such an apparatus can be held the "correct way" or "upside down".

In some embodiments as the way the apparatus should be held may not be trivial to the user, for example where another event has occured during a phone call. In some embodiments the apparatus can indicate to the user which end of the device works as an earpiece and which end has the active microphone using the visual element components.

Figure 8:
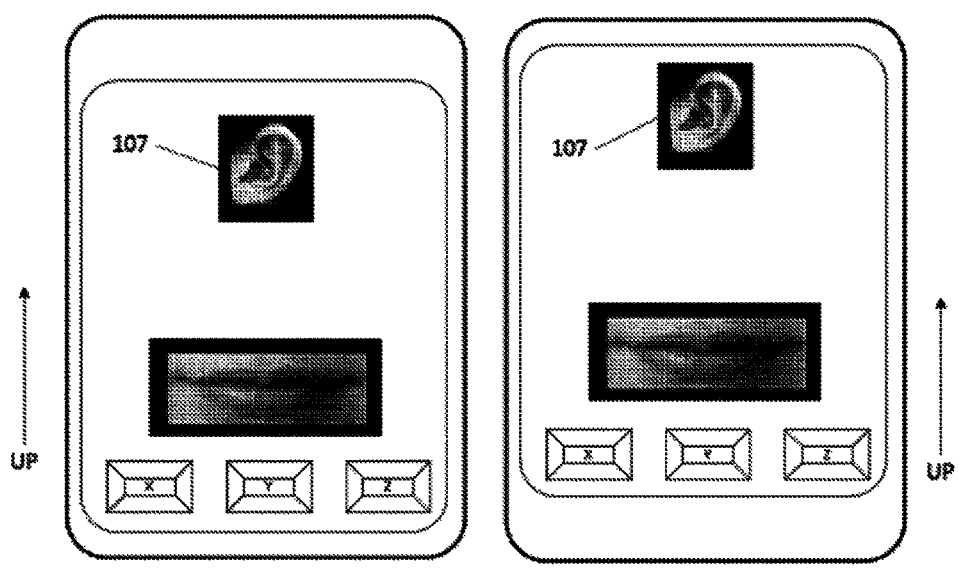

An example of visual element components showing or indicating the current orientation is shown in FIG. 8.

In FIG. 8 an example display configuration of virtual ear and mouth visual element components are shown. In some embodiments the (effectively the virtual earpiece display element 107) display can be an overlay picture.

In some embodiments the apparatus can be configured to determine or recognize when the user tries to use the apparatus the 'wrong way' and indicate to the user. For example in some embodiments the apparatus can be configured to vibrate or play a message to the "wrong" piezo component. In some embodiments the recognition can be performed using the two microphones and detecting how the user holds the device. In some embodiments the accelerometer can be used to detect when the apparatus is held the wrong way around.

It shall be appreciated that the term user equipment is intended to cover any suitable type of wireless user equipment, such as mobile telephones, portable data processing devices or portable web browsers. Furthermore, it will be understood that the term acoustic sound channels is intended to cover sound outlets, channels and cavities, and that such sound channels may be formed integrally with the transducer, or as part of the mechanical integration of the transducer with the device.

In general, the design of various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The design of embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory used in the design of embodiments of the application may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be designed by various components such as integrated circuit modules.

As used in this application, the term 'circuitry' refers to all of the following:
(a) hardware-only circuit implementations (such as implementations in only analog and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
providing at least one display component in an apparatus display, the at least one display component providing a visual element;
determining whether or not the visual element is associated with an orientation exception;
determining whether or not a first audio component is associated with the orientation exception;
determining an orientation of the apparatus;
selecting the first audio component relative to the orientation of the apparatus and based on whether or not the first audio component is associated with the orientation exception, fixing a location of the first audio component independent of the determined orientation of the apparatus; and
based on whether or not the visual element is associated with the orientation exception, adjusting a location of the visual element dependent on the determined orientation of the apparatus.

2. The method as claimed in claim 1, further comprising: outputting an audio signal by the selected first audio component.

3. The method as claimed in claim 1, further comprising locating the first audio component and a second audio component adjacent the apparatus display.

4. The method as claimed in claim 3, wherein determining the at least one display component with an associated location in the apparatus display is based on an apparatus state.

5. The method as claimed in claim 4, wherein the apparatus state is based on at least one of:
determining an apparatus call state;
determining an apparatus activity state; or
determining an apparatus user input state.

6. The method as claimed in claim 1, further comprising:
determining a second orientation of the apparatus;
determining a location of a second audio component with respect to the determined second orientation of the apparatus; and
selecting the second audio component for outputting a second audio signal during the apparatus state.

7. The method as claimed in claim 1, wherein selecting the first audio component further comprises:
selecting at least one microphone transducer located adjacent the apparatus display dependent on the orientation of the apparatus; and
inputting a microphone audio signal from the at least one microphone transducer.

8. The method as claimed in claim 1, further comprising: determining at least one of a size and a shape of the visual element relative to the orientation of the apparatus.

9. The method as claimed in claim 1, wherein the at least one display component comprises the visual element, wherein the visual element is associated with at least one of: position and visual aspects of the visual element.

10. An apparatus comprising at least one processor and at least one memory including computer code for one or more programs, the at least one memory and the computer code configured to with the at least one processor cause the apparatus at least to:
provide at least one display component in an apparatus display, the at least one display component providing a visual element;
determine whether or not the visual element is associated with an orientation exception;
determine whether or not a first audio component is associated with the orientation exception;
determine an orientation of the apparatus;
select the first audio component relative to the orientation of the apparatus and based on whether or not the first audio component is associated with the orientation exception, fix a location of the first audio component independent of the determined orientation of the apparatus; and
based on whether or not the visual element is associated with the orientation exception, adjust a location of the visual element dependent on the determined orientation of the apparatus.

11. The method as claimed in claim 1, further comprising:
configuring the visual element or the first audio component to perform at least one of:
rotating with the apparatus;
fixing the location of the visual element or the first audio component to a number of orientations; or
rotating with the apparatus to a subset of the number of orientations.

12. The apparatus as claimed in claim 10, wherein the at least one display component comprises the visual element, wherein the visual element is associated with at least one of: position and visual aspects of the visual element.

13. The apparatus as claimed in claim 10, wherein the first audio component and a second audio component are located adjacent the apparatus display.

14. The apparatus as claimed in claim 10, further caused to output an audio signal by the selected first audio component.

15. The apparatus as claimed in claim 10, wherein the at least one display component with an associated location is determined in the apparatus display based on an apparatus state.

16. The apparatus as claimed in claim 15, wherein the apparatus state is based on at least one of:
determining an apparatus call state;
determining an apparatus activity state; or
determining an apparatus user input state.

17. The apparatus as claimed in claim 10, further caused to: determine a second orientation of the apparatus; and determine a second audio component with respect to the determined second orientation of the apparatus.

18. The apparatus as claimed in claim 10, further caused to:
- select at least one microphone transducer located adjacent the apparatus display dependent on the orientation of the apparatus; and
- input a microphone audio signal from the selected at least one microphone transducer.

19. The apparatus as claimed in claim 10, further caused to determine at least one of a size and a shape of the visual element dependent on the orientation of the apparatus.

20. The apparatus as claimed in claim 10, wherein the at least one of display component comprises at least one of:
- a virtual button;
- a message image;
- a virtual transducer image;
- a virtual speaker image;
- at least one virtual control button;
- a virtual microphone image; or
- a virtual earpiece image.

\* \* \* \* \*